(12) United States Patent
Audi et al.

(10) Patent No.: US 7,366,053 B2
(45) Date of Patent: Apr. 29, 2008

(54) SYSTEM AND METHOD FOR IMAGING AND TRACKING CONTACTS WITHIN A MEDIUM

(75) Inventors: Paul Patrick Audi, Newport, RI (US); Matthew Patrick Daily, Portsmouth, RI (US); Lynne Maria Dillman, Lafayette Hill, PA (US); Christopher Burbank Lirakis, Portsmouth, RI (US)

(73) Assignee: BBN Technologies, Corp., Cambridge, MA (US)

( * ) Notice: Subject to any disclaimer, the term of this patent is extended or adjusted under 35 U.S.C. 154(b) by 216 days.

(21) Appl. No.: 11/227,322

(22) Filed: Sep. 15, 2005

(65) Prior Publication Data

US 2007/0058487 A1    Mar. 15, 2007

(51) Int. Cl.
*G03B 42/06*    (2006.01)
(52) U.S. Cl. ......................................... 367/11
(58) Field of Classification Search .................... 367/7, 367/11; 382/103, 106, 107
See application file for complete search history.

(56) References Cited

U.S. PATENT DOCUMENTS

| | | | |
|---|---|---|---|
| 3,752,224 A | 8/1973 | Sproul | |
| 4,114,153 A | 9/1978 | Neidell | |
| 4,515,021 A | 5/1985 | Wallace et al. | |
| 4,989,186 A | 1/1991 | Ricker | |
| 5,029,147 A | 7/1991 | Andrews et al. | |
| 5,157,639 A | 10/1992 | Leszcynski | |
| 5,612,928 A * | 3/1997 | Haley et al. | 367/11 |
| 5,914,912 A | 6/1999 | Yang | |
| 5,949,739 A | 9/1999 | Reese | |
| 6,041,019 A | 3/2000 | Jackson et al. | |
| 6,683,820 B1 | 1/2004 | Struzinski | |
| 7,088,829 B1 | 8/2006 | Schick et al. | |
| 7,239,719 B2 * | 7/2007 | Bongiovanni et al. | 382/103 |
| 2004/0264707 A1 | 12/2004 | Yang et al. | |
| 2005/0041102 A1* | 2/2005 | Bongiovanni et al. | 382/107 |
| 2006/0139205 A1 | 6/2006 | Raestad et al. | |
| 2007/0058487 A1* | 3/2007 | Audi et al. | 367/11 |

OTHER PUBLICATIONS

Sandler, "Advanced Fluid Modeling Capability for Underwater Shock Analysis of Naval Platforms", ABSTRACT.
Murino, et al., "Pre-Aligned ICP for the Reconstruction of Complex Objects", University of Verona, Italy.
Cheng, et al., "Computational High-Frequency Wave Propagation Using the Level Set Method, with Applications to the Semi-Classical Limit of Schrodinger Equations".

* cited by examiner

*Primary Examiner*—Dan Pihulic
(74) *Attorney, Agent, or Firm*—Ropes & Gray LLP

(57) ABSTRACT

A system for processing one or more detection signals from an acoustic signal detection system to image and track one or more contacts within a medium including a computer configured to receive the detection signal and a computer readable medium operatively coupled to the computer, that is capable of applying an image processing method to one or more images derived from the received one or more detection signals to estimate the kinematic characteristics of the one or more contacts.

28 Claims, 9 Drawing Sheets

SYSTEM AND METHOD FOR IMAGING AND TRACKING CONTACTS WITHIN A MEDIUM

FIELD OF THE INVENTION

The invention relates generally to systems and methods for acoustic signal detection and, more particularly in various embodiments, to imaging and tracking contacts in a medium using image processing.

BACKGROUND

The use of acoustic signal based systems, such as sonar and echo sounding systems, for detecting and/or tracking a contact or target is well known in the art. Sonar systems, including active sonar systems, have been used to detect and track contacts or targets, e.g., submarines, in a water medium such as the ocean. Echo sounding systems have been used to map the ocean floor.

Sonar systems generally provide information about a contact's distance, bearing, and identification. However, certain physical characteristics of the medium surrounding a contact such as temperature, temperature gradients, salinity (in the case of ocean water), and other factors affect the accuracy and quality of the contact information. To compensate for these effects, active sonar systems and echo sounding systems have, at times, used single or multiple acoustic signal beams in conjunction with an array of acoustic signal or pulse (ping) energy sources, e.g., projectors, and an array of acoustic signal detectors, e.g., hydrophones.

To further compensate for the effects of ocean water characteristics, sonar systems have employed acoustic signal or echo processing methods after detection using computer algorithms to compensate for acoustic signal ambiguities based, for example, on noise cancellation, weighted averaging, phase offset corrections, and acoustic signal parameter simulations. Other methods have also been employed such as single-ping matched filter/beam former detection, empirical clustering and classification of contacts, Kalman filtering, and MAP tracking algorithms. These methods, however, do not adequately address contact imaging and tracking in a highly cluttered environment.

Another drawback of the prior art is that acoustic signal detection techniques have an embedded loss of information in that signal changes between pings are not measured in a detailed manner. This results in inadequate detection and tracking of target in highly cluttered environments, especially occluded and crossing targets.

As a result, a need exists for systems and methods that enable the imaging and tracking of contacts within a medium using post detection signal processing with image processing methods to improve the accuracy and quality of contact imaging and tracking.

SUMMARY

The invention addresses the deficiencies in the prior art by, in various embodiments, providing improved systems and methods for detecting, tracking, and classifying acoustic signals from underwater targets. According to various approaches, the invention employs image processing to aid in achieving such improvements.

In one aspect, the invention employs an image processing approach that includes a level set methodology for automatically extracting, bounding, and identifying significant signal features of acoustic data related to a target over several listening cycles. According to one feature, the image processing approach of the invention predicts the general bounds of the acoustic data in ensuing listening cycles based, at least in part, on moving and/or maneuvering the acoustic signal detection system, and analyzing the signal feature migration. This approach operates effectively in highly cluttered environments to resolve target crossing and occlusions. According to another feature, the invention applies statistical methods, including the Level Set method, to multi-ping active sonar returns such as Time-Frequency and Time-Angle space. These image processing approaches may also be extended to higher dimensionalities, such as an X, Y, Z, Doppler space that is more natural for imaging and tracking real world objects.

According to other embodiments, the invention employs image processing approaches, such as a level set image processing approach, not for (or only for) detecting regions of high signal excess, but instead (or also) for bounding regions of signal statistic consistency or change with curves or surfaces. The bounding surface, rather than (or in addition to) the underlying signals, may then be manipulated, analyzed, and otherwise used for determining target characteristics, such as classification.

The level set approach employed by the invention provides a generalization that allows contours to evolve, split, join, and/or occlude, which in turn enables the invention to accommodate drastic topological changes such as crossing targets and/or contacts. This enables the level set approach to discriminate between stationary random returns. In this way, the application of a level set approach provides enhanced accuracy and robust performance in highly cluttered environments and under scenarios with numerous overlapping contacts.

The generality and expandability of the underlying variational mathematics makes the application of the level set algorithms of the invention to problems of acoustic detection and tracking straightforward for analyses, such as Range/Doppler. They also can be expanded to perform multi-dimensional analyses. The level set approach is based on a variational framework for detecting and tracking multiple moving contacts in image sequences. The algorithm may be implemented such that all or substantially all contact images in the visible region are tracked.

According to one aspect, the invention includes a computer configured to receive detection signals and/or data based on received acoustic signals and/or data and a computer readable medium, e.g., software application, operatively coupled to the computer, for applying the image processing approaches of the invention to one or more images derived from the received detection signals to estimate the kinematic characteristics of one or more contacts.

Because detection data corresponds to received portions of acoustic signals reflected from one or more contacts toward the acoustic signal detection system, the images derived from the detection signals represent time-displaced received portions of acoustic data. According to another feature, the invention uses the time-displaced images to bound regions of signal statistic constancy and/or regions of signal change using curves and/or surfaces.

According to one implementation, the systems and methods of the invention manipulate and analyze the bounded regions to define contours that evolve, split, join, and/or occlude. These contours may be used to determine the direction of movement and/or shape of a contact. The detection signal may include at least one or a combination of the time-frequency and time-angle space of each received portion of the reflected acoustic signals. According to one feature, the invention receives detection signals at multiple intervals and employs a statistical method such as a level set method to analyze the detection signals.

In one embodiment, the level set approach of the invention includes, but is not limited to, the following steps: 1) defining multiple images where each image is associated with a received portion of an acoustic signal; 2) computing the inter-frame difference between sequential pairs of frames; 3) performing contact feature boundary and motion detections using a Bayesian statistical model; 4) defining static and dynamic partitions and an energy map; 5) assigning unique identifiers and associated contours to each contact; and 6) feeding detector outputs after multiple receiving intervals to any one of empirically generated classifiers. In one feature, the level set approach of the invention uses the detection signals from multiple receiving intervals to develop new classification identifiers, features, and/or techniques.

In another feature, the invention the image processing approach of the invention estimates the kinematic characteristics of one or more contacts within an X, Y, Z Doppler space. The medium may be one or combination of a liquid, gas, or solid matter. For example, ocean water is primarily water but also contains suspended solid particles and dissolved chemical compounds such as salt. According to one feature, the kinematic characteristics include any one or a combination of a contact's position, location, shape, movement, and acceleration.

According to another aspect, the invention includes a source, detector, and computer with a computer readable medium, i.e., a software application, for imaging and tracking contacts within a medium. According to one feature, the source propagates one or more acoustic signals through the medium to one or more contacts and the detector receives a portion of the one or more acoustic signals reflected from the one or more contacts. The computer maintains communications with the detector while also being operatively coupled to a computer readable medium that applies an image processing approach to one or more images derived from the received portions of acoustic signals to estimate the kinematic characteristics of the one or more contacts within the medium.

In one feature, the source and detector are separate transducers. In another feature the source and detector use the same transducer where the transducer may alternate between its source function and detector function. In one embodiment, the source and detector include additional components. For example, the detector may include a amplifier circuit, analog-to-digital converter, microprocessor, and an other electronic circuitry, either integrated with the transducer or other electromechanical acoustic signal detector, to facilitate conversion of the acoustic signal from the medium into a proportional and/or corresponding electrical detection signal.

In another feature, the source and detector include separate components such a beam former and hydrophone respectively. The source and detector may be co-located within the same vessel or at the same location. In certain embodiments where the source and detector are located within or attached to a vessel such as a ship, boat, or submarine, the location the source and detector may change according to time in relation to one or more contacts, requiring the systems and methods of the invention to monitor and account for the relative changes in location between the source/detector and one or more contacts.

Other applications, features, benefits, and related systems and methods of the invention are described below.

BRIEF DESCRIPTION OF THE DRAWINGS

These and other features and advantages of the invention will be more fully understood by the following illustrative description with reference to the appended drawings, in which like elements are labeled with like reference designations and which may not be to scale.

ILLUSTRATIVE DESCRIPTION

Figure 1:
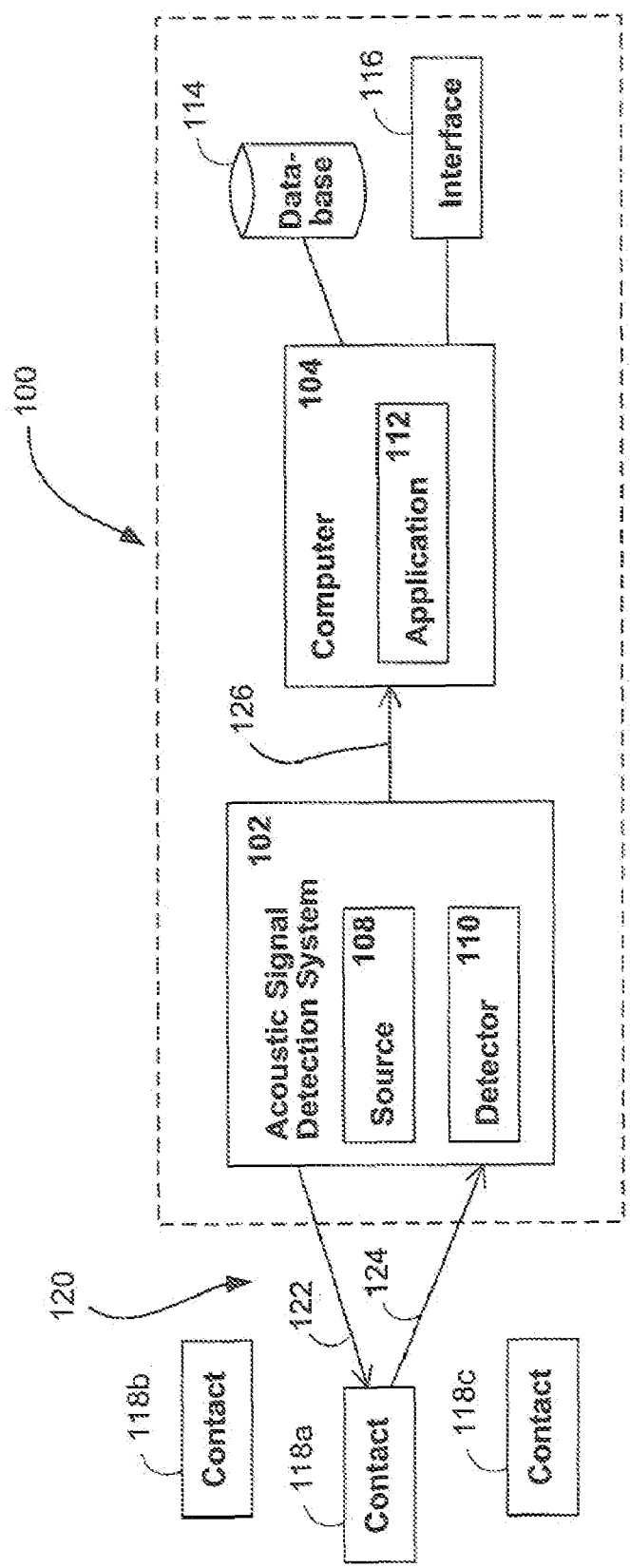
FIG. 1 is a conceptual block diagram of an imaging and tracking system according to an illustrative embodiment of the invention.

FIG. 1 shows a conceptual block diagram of a system 100 for imaging and tracking contacts 118 within a medium 120 according to an illustrative embodiment of the invention. The medium 120 may include any one or combination of a liquid, gas, vapor, or solid matter. In one example, the medium is ocean water that includes water, dissolved chemicals, and suspended particles among other components. The system 100 includes an acoustic signal detection system 102, e.g., a sonar or echo sounding system, and a computer 104. The acoustic signal detection system 102 includes a source 108 and a detector 110. The computer 104 executes an imaging and tracking application 112. Other system 100 components include, for example, a classifier database 114 and an external interface 116.

The source 108 is configured to propagate one or more acoustic signals 122 through the medium 120 to one or more contacts 118, more specifically 118a, 118b, and/or 118c. The detector 110 is configured to receive a portion of the one or more acoustic signals 124 reflected from the one or more contacts 118. The computer 104 communicates with the detector 110 while also executing the imaging and tracking application 112. According to the illustrative embodiment, the imaging and tracking application 112 is configured to apply a statistical method to one or more images derived from the received portions of the acoustic signals 124 to estimate the kinematic characteristics of the one or more contacts 118 within the medium 120.

The source 108 and the detector 110 may be separate transducers or may use the same transducer where the transducer may, for example, alternate between a source function and a detector function. In the acoustic signal detection system 102, the source 108 converts electrical energy into acoustic energy and the detector 110 converts acoustic energy into electrical energy. The acoustic energy is typically in the forms of oscillations of molecules of the medium through which sound travels. Various types of transducers may be employed including, without limitation, crystal, ceramic, and magnetostrictive transducers. In some illustrative embodiments, the detector 110 includes a magnetostrictive transducer hydrophone for receiving the acoustic signals.

The source 108 and the detector 110 may also include additional components. For example, the detector 110 may include an amplifier circuit, analog-to-digital converter, microprocessor, filter, and other conventional electronic circuitry, either integrated with the transducer or other electromechanical acoustic signal detector, for facilitating conversion of the acoustic signal from the medium 120 into proportional and/or corresponding electrical detection signals 126. The source 108 may include an amplifier circuit, digital-to-analog converter, filter, and other conventional electronic circuitry for facilitating generation of acoustic pulses or pings.

In one configuration, the source 108 is a beam former and the detector 110 is a hydrophone. In other configurations, the source 108 and/or detector 110 include multiple transducers arranged as a cylindrical, conformal, spherical, towed, or wide aperture array. It should be noted that since one objective of the invention is to enhance the ability of existing acoustic signal detection systems using novel post detection signal processing approaches of invention, any suitable acoustic signal detection system may be employed.

According to one illustrative embodiment, the source 108 and the detector 110 are co-located within the same vessel, e.g., a naval ship, or at the same location. For example, the acoustic signal detection system 102 may be the sonar system for a submarine, ship, or other water craft where the medium is ocean water. In some such configurations, the location of the source 108 and detector 110 may change according to time in relation to one or more contacts 118. According to one feature of the invention, the imaging and tracking application 112 monitors and accounts or otherwise compensates for the relative changes in location or distance between the detector 110 and one or more contacts 118. In other implementations, the acoustic signal detection system 102 is a compact, portable, handheld device used for locating contacts embedded in solid or semi-solid matter, such as a void under the surface of the earth.

Figure 2:
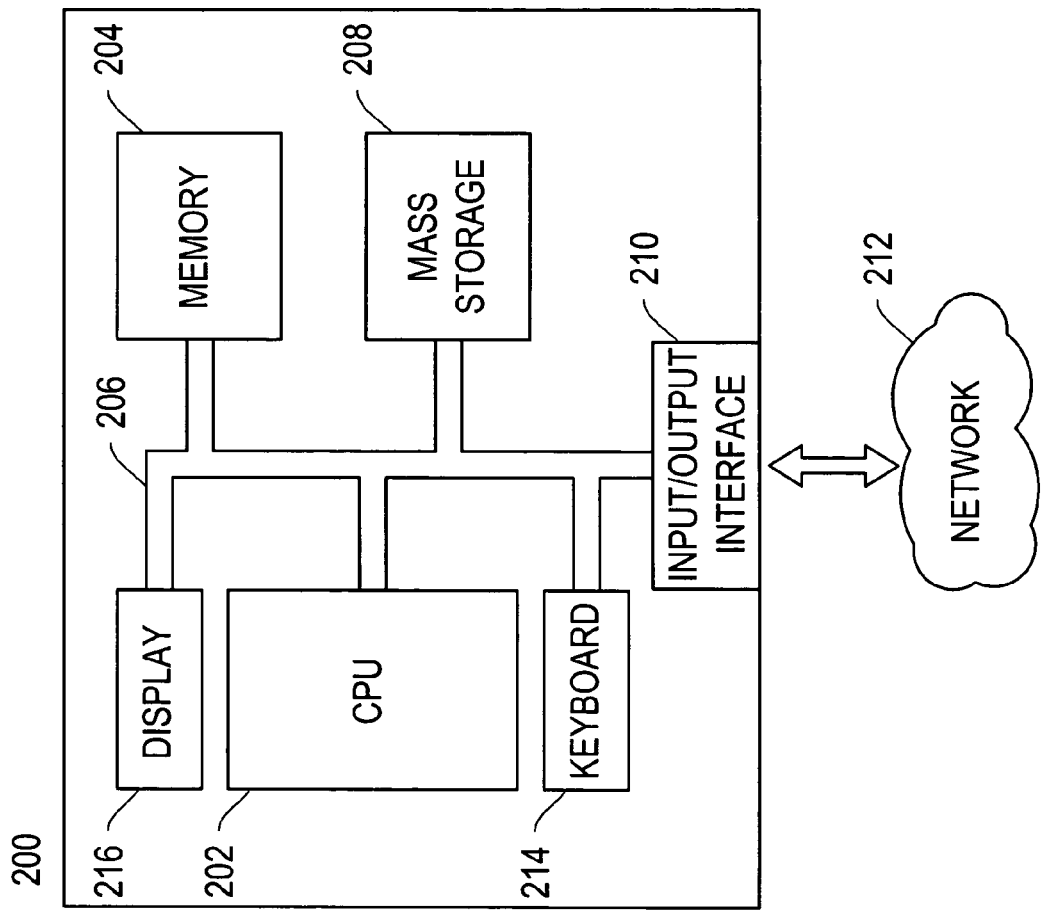
FIG. 2 is a functional block diagram of a computer for processing imaging and tracking information according to an illustrative embodiment of the invention.

FIG. 2 shows a functional block diagram of general purpose computer system 200 for performing the functions of the computer 104 according to an illustrative embodiment of the invention. The exemplary computer system 200 includes a central processing unit (CPU) 202, a memory 204, and an interconnect bus 206. The CPU 202 may include a single microprocessor or a plurality of microprocessors for configuring computer system 200 as a multi-processor system. The memory 204 illustratively includes a main memory and a read only memory. The computer 200 also includes the mass storage device 208 having, for example, various disk drives, tape drives, etc. The main memory 204 also includes dynamic random access memory (DRAM) and high-speed cache memory. In operation, the main memory 204 stores at least portions of instructions and data for execution by the CPU 202.

The mass storage 208 may include one or more magnetic disk or tape drives or optical disk drives, for storing data and instructions for use by the CPU 202. At least one component of the mass storage system 208, preferably in the form of a disk drive or tape drive, stores the database used for processing the imaging and targeting of system 100 of the invention. The mass storage system 208 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 200.

The computer system 200 may also include one or more input/output interfaces for communications, shown by way of example, as interface 210 for data communications via the network 212. The data interface 210 may be a modem, an Ethernet card or any other suitable data communications device. To provide the functions of a computer 104 according to FIG. 1, the data interface 210 may provide a relatively high-speed link to a network 212, such as an intranet, internet, or the Internet, either directly or through an another external interface 116. The communication link to the network 212 may be, for example, optical, wired, or wireless (e.g., via satellite or cellular network). Alternatively, the computer system 200 may include a mainframe or other type of host computer system capable of Web-based communications via the network 212.

The computer system 200 also includes suitable input/output ports or use the interconnect bus 206 for interconnection with a local display 216 and keyboard 214 or the like serving as a local user interface for programming and/or data retrieval purposes. Alternatively, server operations personnel may interact with the system 200 for controlling and/or programming the system from remote terminal devices via the network 212. The present invention relates to a method and system for accelerating receipt of data in a client-to-client network and, more particularly, to use of an acceleration server in proximity to user clients within the network to store previously received data.

The computer system 200 may run a variety of application programs and stores associated data in a database of mass storage system 208. One or more such applications may enable the receipt and delivery of messages to enable operation as a server, for implementing server functions relating to imaging and tracking the contacts 118 of FIG. 1.

The components contained in the computer system 200 are those typically found in general purpose computer systems used as servers, workstations, personal computers, network terminals, and the like. In fact, these components are intended to represent a broad category of such computer components that are well known in the art. Certain aspects of the invention may relate to the software elements, such as the executable code and database for the server functions of the imaging and tracking system 100.

Figure 3:
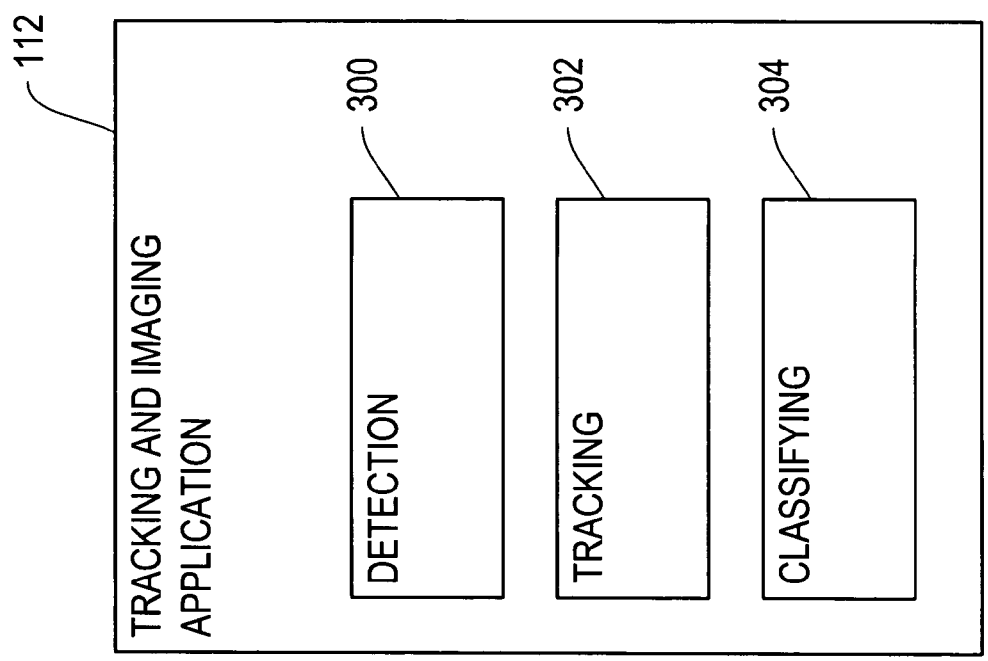
FIG. 3 is a conceptual block diagram an imaging and tracking application according to an illustrative embodiment of the invention.

FIG. 3 shows a conceptual block diagram of the imaging and tracking application 112 according to an illustrative embodiment of the invention. The imaging and tracking application 112 may be implemented, for example, in software, hardware, or firmware application programmed or embedded into the memory of the computer 104. The imaging and tracking application 112 may include any one or a combination of a detection routine 300, tracking routine 302, and classification routine 304. Each routine may be a software routine within an imaging and tracking software application 112 or may be a hardware unit (e.g., an application specific integrated circuit) in communications with a hardware imaging and tracking application 112. Illustrative functions of each routine shall be discussed in further detail below.

Figure 4:
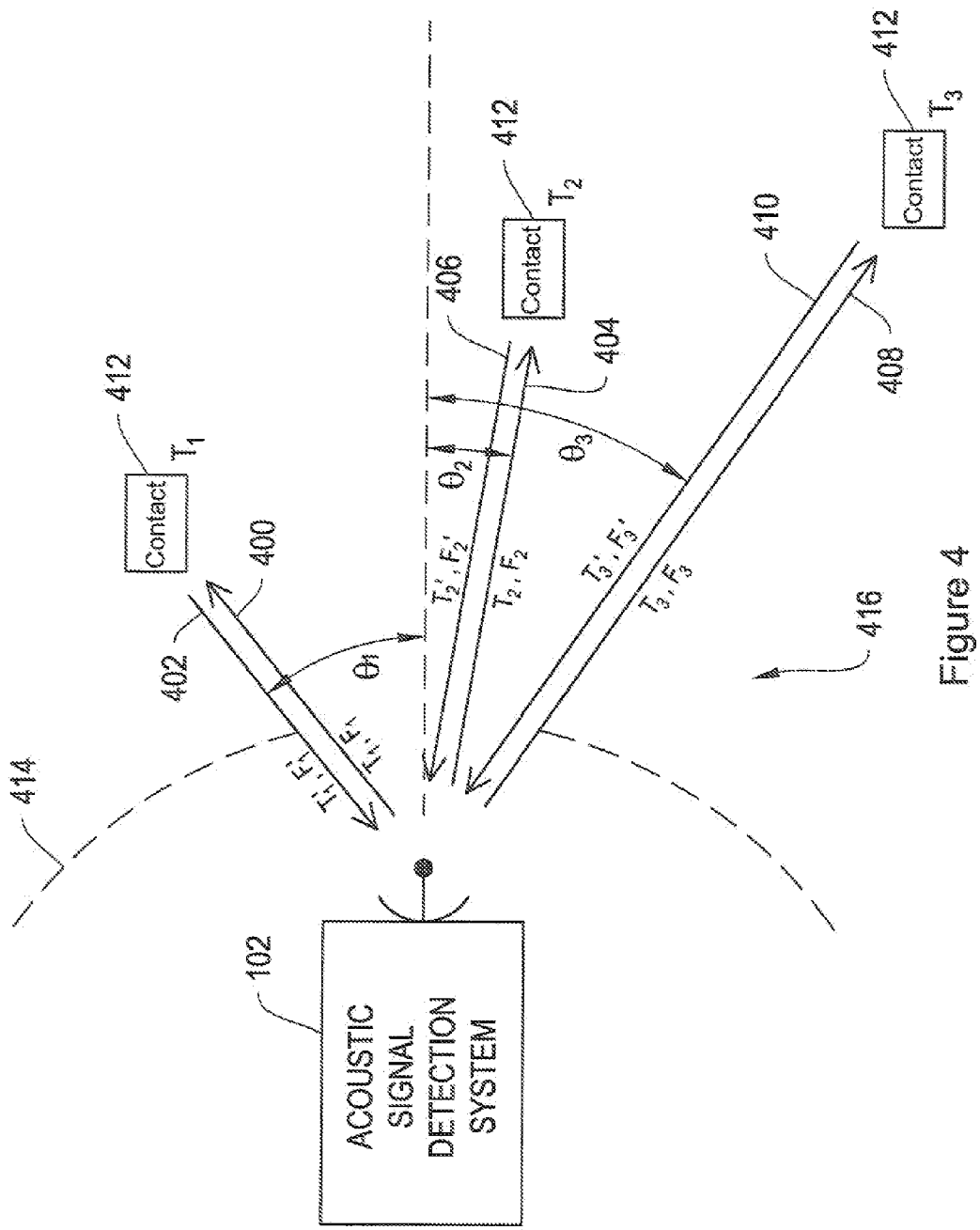
FIG. 4 is a diagram illustrating time-frequency and time-angle variations of a contact moving in a medium over several time intervals.

As shown in FIG. 4, in one illustrative embodiment, the acoustic signal detection system 102 emits multiple acoustic signals 400, 404, and 408 at times $T_1$, $T_2$, and $T_3$, respectively. Each acoustic signal 400, 404, and 408 travels through a medium 416 with an isotropically expanding wave characteristic 414. Each acoustic signal 400, 404, or 408 represents a component of an expanding wave that impacts a contact 412 and is reflected back to the acoustic signal detection system 102 as acoustic signals 402, 406, and 408, arriving at times $T_1'$, $T_2'$, $T_3'$, respectively. Illustratively, the acoustic signals 400, 404, and 408 operate at frequencies $F_1$, $F_2$, $F_3$, respectively. However, depending on the movement of the contact 412, the frequencies of $F_1'$, $F_2'$, $F_3'$ may vary due to the Doppler effect. For example, in FIG. 4, the contact 412 is moving away from acoustic signal detector 102 over times $T_1'$, $T_2'$, $T_3'$ and therefore, the frequencies of $F_1'$, $F_2'$, $F_3'$ progressively decrease. Due to the Doppler effect, frequencies received above the emitted frequency indicate that the contact 412 is closing while frequencies below the emitted frequency indicate that the contact 412 is opening or traveling away from the acoustic signal source.

Another measurable component of acoustic signals 402, 406, and 410 may be the angle of received reflected acoustic signals $\theta_1$, $\theta_2$, $\theta_3$, which enable the acoustic signal detection system 102 to predict the bearing of the contact 412 based on the angle of the portion of the received acoustic signals 402, 406, and 410. In other aspects, narrow beams of acoustic signals 400, 404, and 408 may be directed at specific angles using beam steering processes in which case $\theta_1$, $\theta_2$, $\theta_3$ correspond to the angle between the emitted acoustic signals 400, 404, and 408 and the received reflected signals 402, 406, and 410.

Once the acoustic signals 402, 406, and 410 are received by the acoustic signal detection system 102, the detector 110 converts the received acoustic signals 402, 406, and 410 into one or more representative electrical detection signals 126 corresponding to the acoustic signals 402, 406, and 410 which are portions of the acoustic signals 400, 404, and 408.

Figure 5:
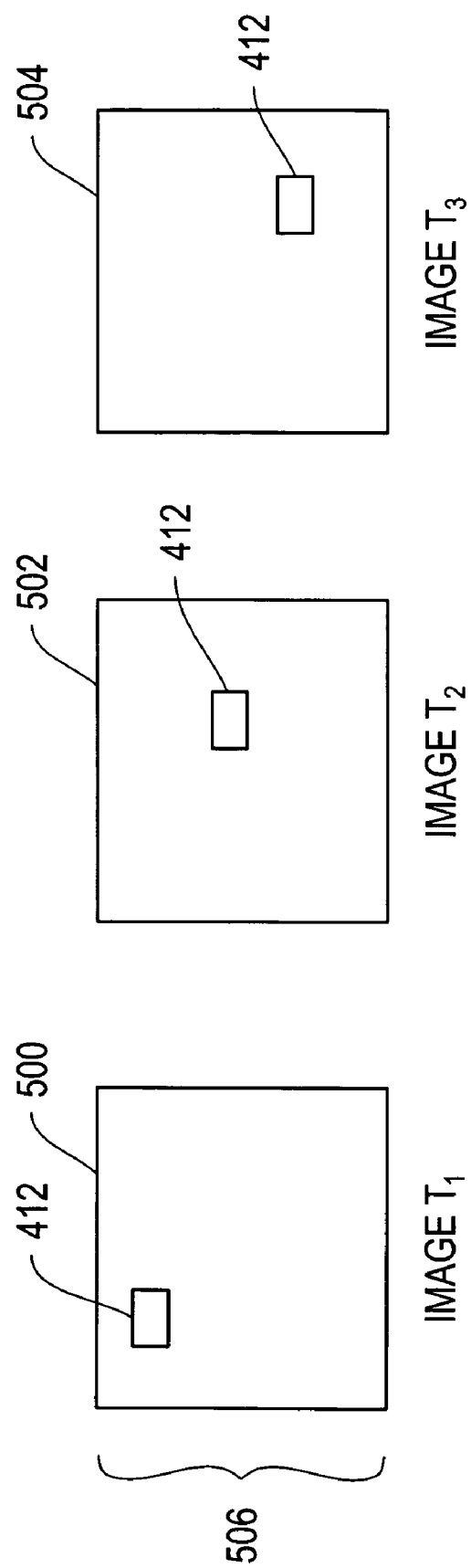
FIG. 5 shows exemplary sequential views of an image display of the contact in FIG. 4 at several time intervals according to an illustrative embodiment of the invention.

The detection signals 126 are then used to generated the image frames 500, 502, and 504 of FIG. 5 either directly by the acoustic signal detection system 102, or may be delivered to another system such as computer 104 of FIG. 1 for image generation and further processing. Illustratively, each sequential image frame 500, 502, and 504 corresponds to and represents the kinematic characteristics of a contact 412 as determined from the acoustic signals 402, 406, and 408, arriving at times $T_1'$, $T_2'$, $T_3'$, respectively. The kinematic characteristics preferably include any one or combination of the contact's position, location, movement, shape, velocity, bearing, and acceleration.

Figure 6:
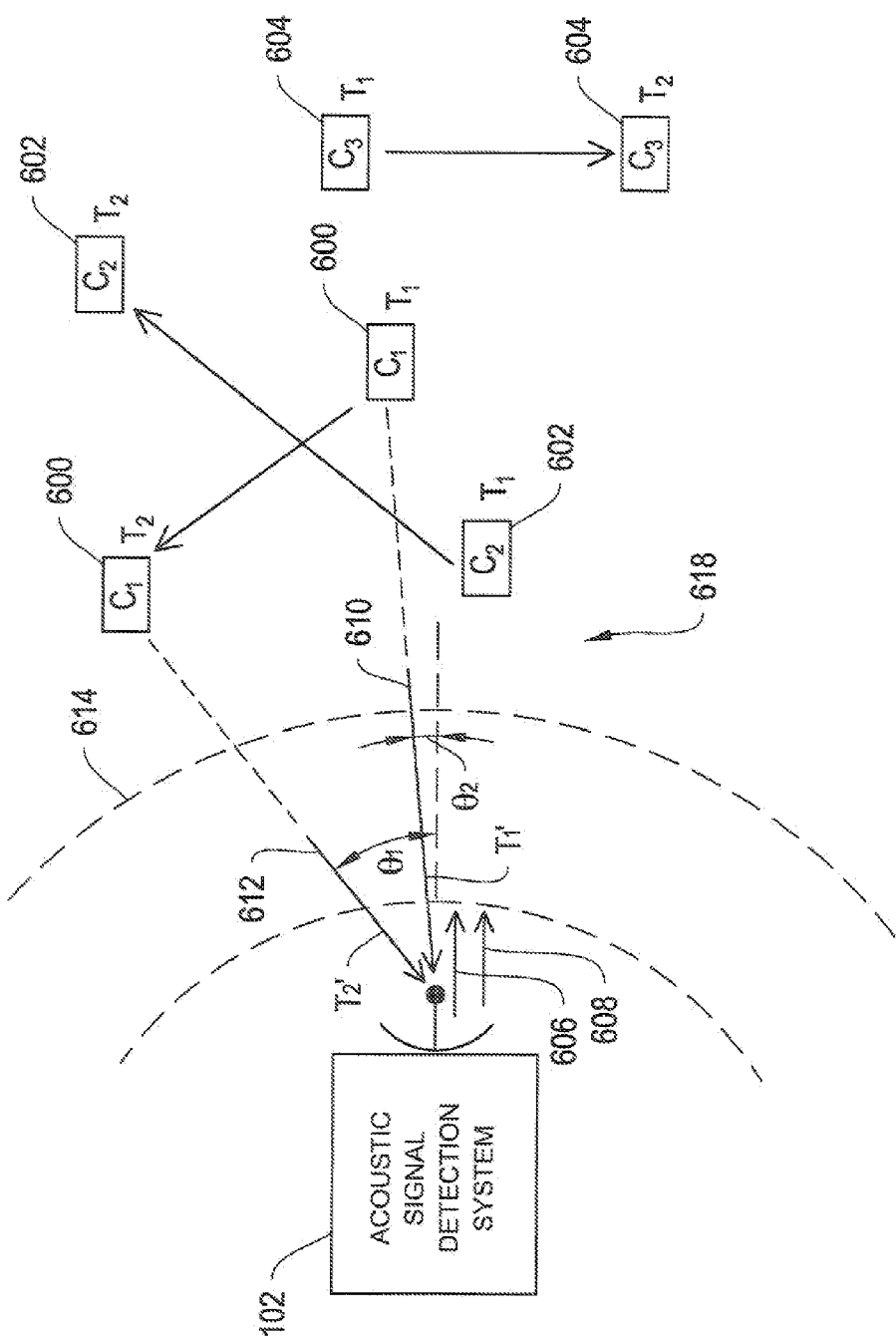
FIG. 6 is a diagram illustrating time-frequency and time-angle variations of multiple contacts moving in a medium at different time intervals.

FIG. 6 provides a conceptual diagram of an acoustic signal detection process involving multiple contacts 600, 602, and 604 according to an illustrative embodiment of the invention. For exemplary purposes, only the time, angle, and frequency information associated with the contact 600 is shown. However, similar information is detected by the illustrative system 102 for the contacts 602 and 604.

With regard to the contact 600, the acoustic signal 606 is emitted from acoustic signal detection system 102 at time $T_1$ with frequency $F_1$. In response to the acoustic signal 606, the contact 600 reflects back acoustic signal 610 at time $T_1'$ with frequency $F_1'$ and angle $\theta_1$. The acoustic signal detection system 102 uses the detector 110 to generate a detection signal 126 representing the received acoustic signal 610. The acoustic signal detection system 102 also receives reflected acoustic signals from contacts 602 and 604 due to the isotropically expanding wave characteristic 614 of acoustic signal 606 that causes all contacts in its path to reflect a portion of the acoustic signal 606 back toward acoustic signal detection system 102.

At time $T_2$, the acoustic signal detection system 102 emits the acoustic signal 608, resulting in the received acoustic signal 612 at time $T_2'$ with frequency $F_2'$ and angle $\theta_2$ along with received acoustic signals form contacts 602 and 604. The difference in time ($\Delta T$) between the departure of the acoustic signal 606 at $T_1$ and arrival of acoustic signal 610 at time $T_1'$ is used, for example, to determine the distance of a contact 600 at a point in time. The time-frequency and time-angle space information of each detection signal 126 includes, for example without limitation, a combination of time, delta time, frequency, and angle information.

Figure 7:
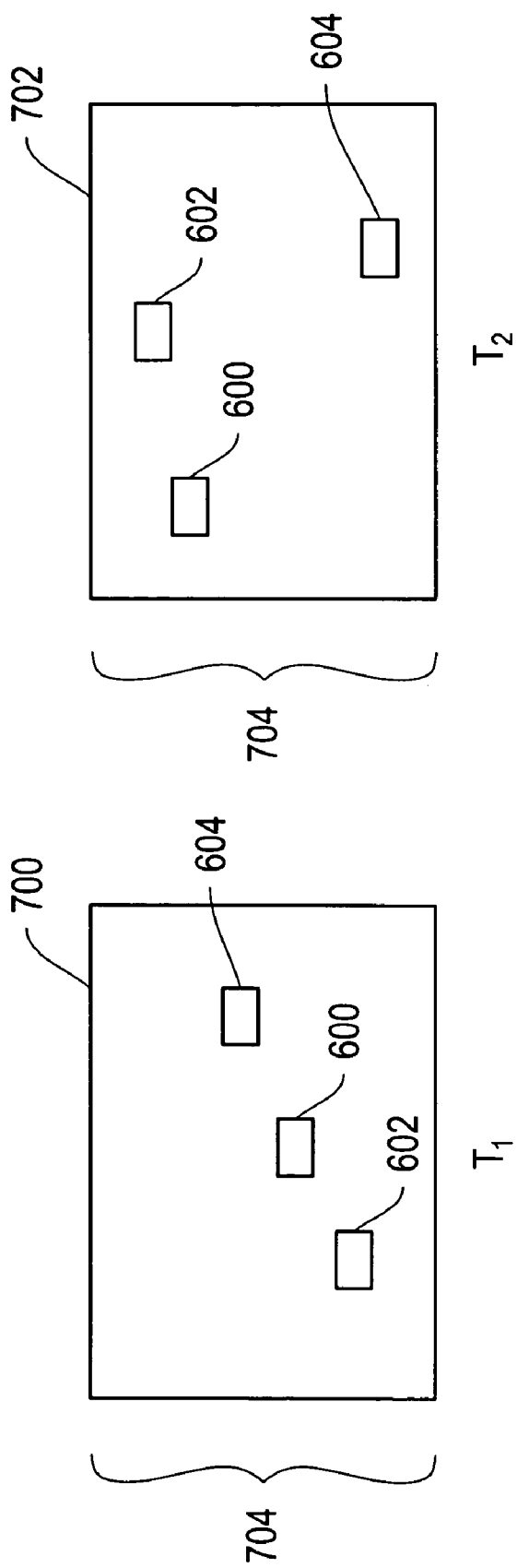
FIG. 7 shows exemplary sequential views of an image display of the contacts in FIG. 6 at different times according to an illustrative embodiment of the invention.

FIG. 7 shows exemplary sequential image frames 700 and 702 of a display of the contacts 600, 602, and 604 of FIG. 6 at different times according to an illustrative embodiment of the invention. As shown in FIG. 7, the detection signal 126 created by the detector 110 based on the kinematic characteristics detected for the contacts 600, 602, and 604 and received at time $T_1'$ is used to generate the image frame 700 showing the contacts 600, 602, and 604 within the detection space 704. The detection signal 126 created by detector 110 based on the kinematic characteristics detected for the contacts 600, 602, and 604 at time $T_2'$ is also used to generate the image frame 702 showing the contacts 600, 602, and 604 after each contact has moved in a cluttered environment. Illustratively, image frames 700 and 702 represent the time-displaced received portions of the acoustic signals 610 and 612 respectively, and the portions of the acoustic signals associated with the contacts 602 and 604.

The one or more detection signals 126, detected at times $T_1'$, $T_2'$ for the multiple contacts by the system 102, are then delivered to the computer 104. In one embodiment, the detection signals 126 are delivered in real time at multiple intervals as each detection signal 126 is created. In another embodiment, the multiple detection signals 126 from multiple intervals are delivered in batches to the computer 104. The detection signals 126 are delivered to the computer 104 for imaging and tracking the contacts 600, 602, and 604 of FIG. 6 within the medium 618. The computer 104, for example, uses the interface 210 of FIG. 2 to receive the one or more detection signals 126. Once received, a computer readable medium, such as image and tracking application 112, applies an image processing method to the one or more images, e.g., images 700 and 702 of FIG. 7, derived from the received detection signals 126 to estimate the kinematic characteristics of the contacts 600, 602, and 604.

In one illustrative embodiment, the image processing method includes a geometric and/or numerical process in which an implicit data representation of a hypersurface, e.g., a multi-dimensional object, is used. The image and tracking application 112 defines a set of partial differential equations (PDE) to determine the manner in which the hypersurface moves. The image and tracking application 112 also defines the numerical methods used to implement the hypersurface using the computer 104 to perform the imaging and tracking of contacts 600, 602, and 604.

Based on the illustrative image processing technique, the time-displaced images 700 and 702 are used by the image and tracking application 112 to bound regions of signal statistic constancy and/or change of the image frames 700 and 702 using curves or surfaces of the hypersurface model. The image and tracking application 112 then manipulates and analyzes the bounded regions of image frames 700 and 702 to define contours that may evolve, split, join, and/or occlude. The resulting contours then determine the kinematic properties of all or substantially all contacts 600, 602, and 604 within the images 700 and 702, including the direction of movement, speed, bearing, and, possibly, even the shape of a contact.

Over further intervals, additional images of contacts 600, 602, and 604 are generated and analyzed using the image processing approach of the invention. Thus, contact 600, 602, and 604 detection, targeting, and tracking is enhanced by analyzing the generated images, e.g., image frames 700 and 702, of the contacts 600, 604, and 606 instead of or in addition to analyzing the underlying acoustic signals of the contacts 600, 602, and 604.

Figure 8:
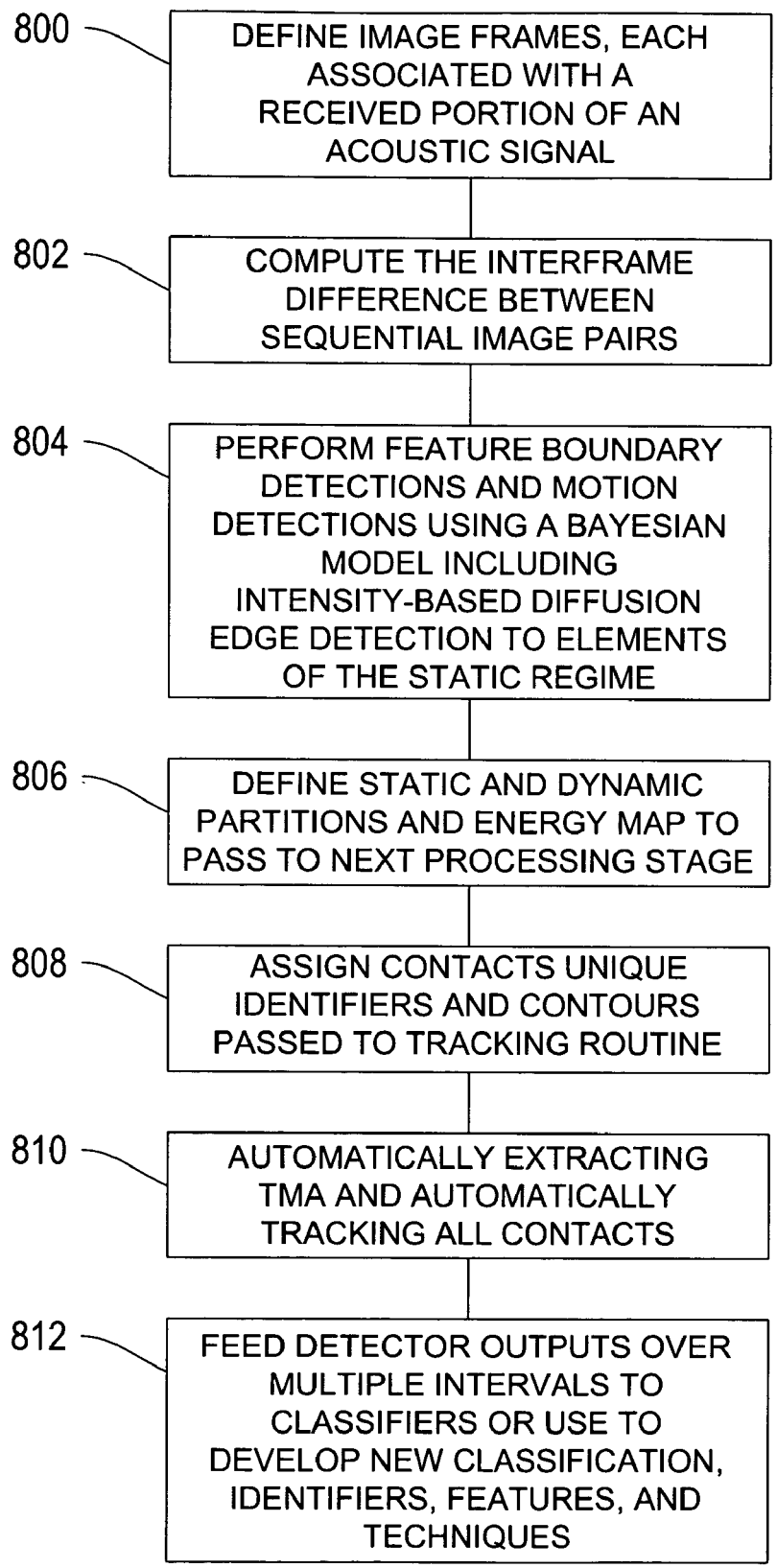
FIG. 8 is a flow diagram of an exemplary level set method for processing imaging and tracking information according to an illustrative embodiment of the invention.

FIG. 8 is a flow diagram of an exemplary image processing approach including a level set method that, in certain embodiments, is used by the imaging and tracking application 112 for imaging and tracking the contacts 600, 602, and 604. Using the detection routine 300, the image and tracking application 112 defines multiple images, e.g., images frames 700 and 702, with each based on the received acoustic signals 610, 612, and those associated with contacts 602 and 604 (Step 800). Then, the interframe differences between sequential image frames 700 and 702 are computed (Step 802).

Once computed, the image and tracking application 112 performs contact feature boundary and motion detections using a Bayesian statistical model. Intensity-based diffusion edge detection, for example, is applied to the elements of the static regime while statistical representation, in conjunction with the diffused edge detector, provides the contact detection boundaries for subsequent processing (Step 804). The image and tracking application 112 then defines static and dynamic partitions and an associated energy map (Step 806). Due to the generalized structure of the underlying mathematics associated with a level set methodology, the detection criteria may be modified to handle additional data sources.

The image and tracking application 112 then assigns unique identifiers and associated contours to each contact 600, 602, and 604 which are passed to the tracking routine 302 (Step 808). The tracking routine 302 then operates on a sequence of images, e.g., image frames 700 and 702, to evolve the contours associated with each contact 600, 602, and 604 as they move through the detection space 704 while employing object-oriented representations for each contour that has converged on a contact 600, 602, and 604 (Step 810). Target motion analysis (TMA) data is then automatically extracted by applying geometry-based transformations on each contact curve's coordinates for automatically tracking all contacts in the visible region of image frames 700 and 702 (Step 812).

Once a contact, e.g., contact 600, has evolved over several listening intervals, the parameters of this evolution along with the statistics of the encompassed detector 110 output detection signals 126 are delivered to empirically generated classifiers or used in the development of new classification identifier, features, and techniques (Step 812).

Figure 9:
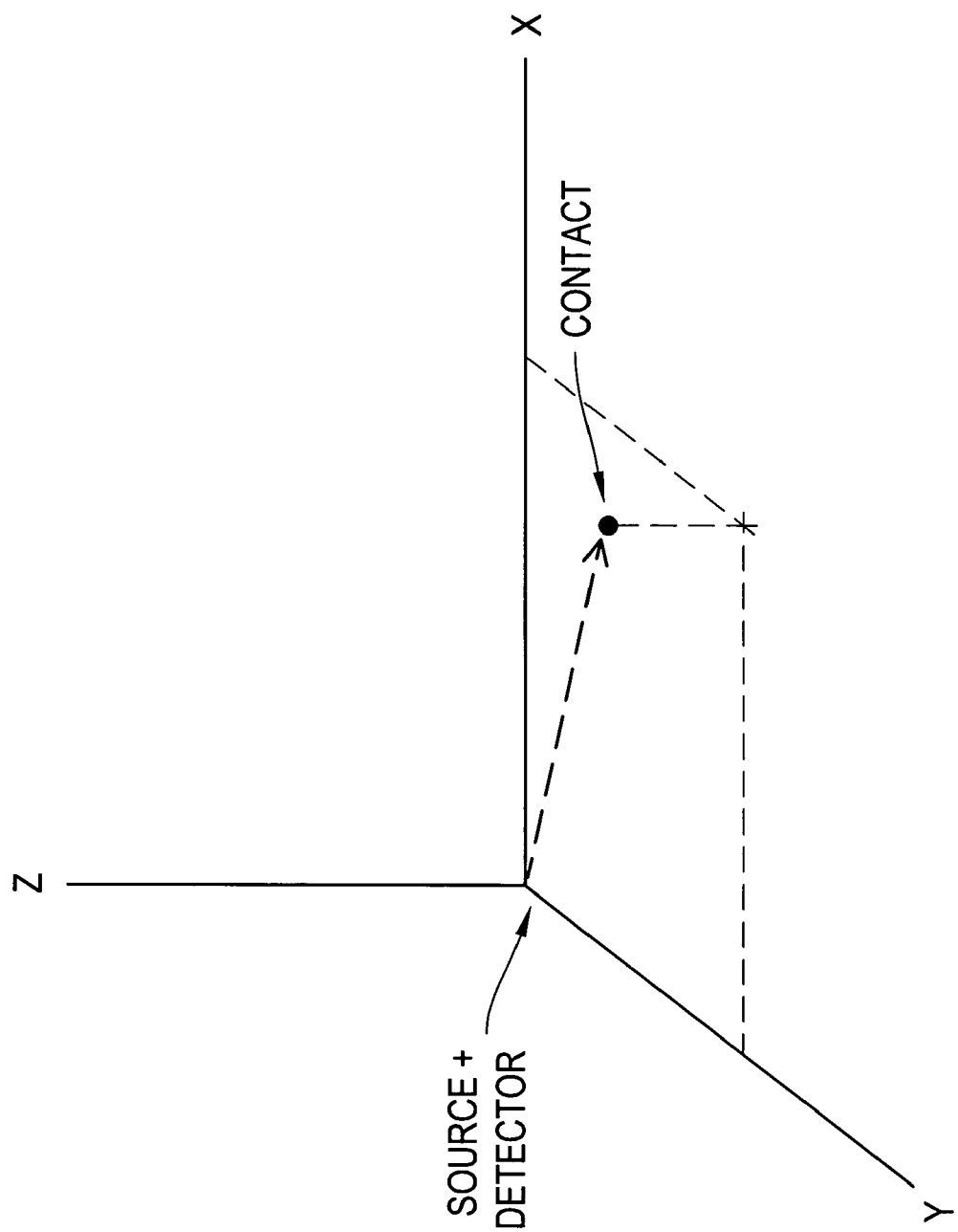
FIG. 9 is an exemplary diagram showing a contact location with X, Y, Z Doppler coordinates in relation to an acoustic detection system according to an illustrative embodiment of the invention.

FIG. 9 is an exemplary diagram showing a contact location with X, Y, Z Doppler coordinates in relation to an acoustic detection system 102 according to an illustrative embodiment of the invention. The above-described illustrative imaging and tracking approaches for contacts 600, 602, and 604 may be employed for estimating the kinematic characteristics of one or more contacts within an X, Y, Z Doppler space. In certain embodiments, the image and tracking application 112 employs the above-described image processing approaches including, for example, a level set method, to image and track a contact within a X, Y, Z Doppler space that is more natural for imaging and tracking real world objects.

It will be apparent to those of ordinary skill in the art that methods involved in the present invention may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for analyzing one or more contacts within a medium comprising:

receiving acoustic data relating to the one or more contacts, deriving one or more images from the acoustic data, and analyzing the movement of the one or more contacts within an X, Y, Z, Doppler space by processing the one or more images, the processing including applying a level set method to the one or more images.

2. The method according to claim 1, wherein the analyzing includes determining the kinematic characteristics of the one or more contacts.

3. The method according to claim 2, wherein the kinematic characteristics include at least one or a combination of position, location, movement, velocity, bearing, and acceleration.

4. The method according to claim 1, wherein the analyzing includes determining the shape of the one or more contacts.

5. The method according to claim 1 comprising receiving additional acoustic data relating to the one or more contacts at multiple time intervals.

6. The method according to claim 1, wherein the level set method includes, identifying multiple image frames from the received acoustic data, computing an inter-frame difference between sequential pairs of the image frames, and processing contact feature boundary changes using a Bayesian statistical model to analyze the motion of one or more contacts.

7. The method according to claim 6 comprising defining static and dynamic partitions between the each sequential pair of image frames.

8. The method according to claim 1 comprising classifying the one or more contacts based on the acoustic data received at multiple time intervals.

9. The method according to claim 1, wherein the one or more images are time-displaced, each image corresponding to one or more time-displaced received portions of the acoustic data.

10. The method according to claim 9, wherein the processing of the time-displaced images include bounding regions of statistic constancy with at least one of curves and surfaces.

11. The method according to claim 10, wherein the processing includes manipulating bounded regions to define contours that perform at least one of evolve, split, join, and occlude, the contours determining the direction of movement of one or more contacts.

12. The method according to claim 9, wherein the processing of the time-displaced images include bounding regions of statistic change with at least one of curves and surfaces.

13. The method according to claim 12, wherein the processing includes manipulating bounded regions to define contours that perform at least one of evolve, split, join, and occlude, the contours determining the direction of movement of one or more contacts.

14. A method for analyzing one or more contacts within a medium comprising:
propagating one or more acoustic signals through the medium to the one or more contacts,
detecting a reflected portion of the one or more acoustic signals from the one or more contacts, and
deriving one or more images from the received portions of acoustic signals, and
analyzing the movement of the one or more contacts within an X, Y, Z, Doppler space by processing the one or more images using a level set method.

15. A system for analyzing one or more contacts in a medium comprising,
a computer configured for communication with acoustic detectors and for applying an image processing method including a level set method to one or more images derived from the received detection data to estimate the kinematic characteristics of the one or more contacts within an X, Y, Z, Doppler space.

16. A system for analyzing one or more contacts in a medium comprising:
a source configured to propagate one or more acoustic signals through the medium to one or more contacts,
a detector configured to receive one or more reflected portions of the propagated acoustic signals reflected from the one or more contacts and providing detection data indicative thereof, and
a computer in communications with the detector for processing the detection data from the detector to derive one or more images, and for processing the one or more images to analyze the movement of the one or more contacts within an X, Y, Z Doppler space, the processing including applying a level set method to the one or more images.

17. The system according to claim 16, wherein the processing includes determining the kinematic characteristics of the one or more contacts.

18. The system according to claim 17, wherein the kinematic characteristics include at least one or a combination of position, location, movement, velocity, bearing, and acceleration.

19. The system according to claim 16, wherein the processing includes determining the shape of the one or more contacts.

20. The method according to claim 16, where the processing includes receiving additional acoustic detection data relating to the one or more contacts at multiple time intervals.

21. The system according to claim 16, wherein the level set method includes,
identifying multiple image frames from the received acoustic data,
computing an inter-frame difference between sequential pairs of the image frames, and
processing contact feature boundary changes using a Bayesian statistical model to analyze the motion of one or more contacts.

22. The system according to claim 21, wherein the level set method includes defining static and dynamic partitions between the each sequential pair of image frames.

23. The system according to claim 16, wherein the processing includes classifying the one or more contacts based on the acoustic data received at multiple time intervals.

24. The system according to claim 16, wherein the one or more images are time-displaced, each image corresponding to one or more time-displaced received portions of the acoustic data.

25. The system according to claim 24, wherein the processing of the time-displaced images include bounding regions of statistic constancy with at least one of curves and surfaces.

26. The system according to claim 25, wherein the processing includes manipulating bounded regions to define contours that perform at least one of evolve, split, join, and occlude, the contours determining the direction of movement of one or more contacts.

27. The system according to claim 24, wherein the processing of the time-displaced images include bounding regions of statistic change with at least one of curves and surfaces.

28. The system according to claim 27, wherein the processing includes manipulating bounded regions to define contours that perform at least one of evolve, split, join, and occlude, the contours determining the direction of movement of one or more contacts.

* * * * *